United States Patent
Côté et al.

(10) Patent No.: US 6,290,092 B1
(45) Date of Patent: *Sep. 18, 2001

(54) DISPOSABLE PROTECTIVE CLOSURE

(75) Inventors: Steeve Stephen Côté, St. Hubert; Tibor Urac; David Alexander Judson, both of Toronto, all of (CA)

(73) Assignee: Pratt & Whitney Canada Corp., Longueuil (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 7 days.

(21) Appl. No.: 09/272,174

(22) Filed: Mar. 18, 1999

(51) Int. Cl.[7] .............................. B65D 59/02; F16L 57/00
(52) U.S. Cl. ...................... 220/796; 220/802; 220/805; 138/89; 138/96 R
(58) Field of Search .............................. 285/901; 138/89, 138/89.1, 89.2, 89.3, 89.4, 90, 96 R, 96 T; 220/287, 375, 212, 796, 801–804, 789–792, 805; 215/228, 317, 319, 320, 354, 355, 306

(56) References Cited

U.S. PATENT DOCUMENTS

| | | | |
|---|---|---|---|
| 3,065,767 | * 11/1962 | Topf | 138/89 |
| 3,574,312 | * 4/1971 | Miller | 138/96 R |
| 3,996,966 | * 12/1976 | Princell | 138/89 |
| 4,046,168 | * 9/1977 | Milne | 138/89 |
| 4,342,337 | * 8/1982 | Underwood | 138/96 T |
| 4,379,472 | * 4/1983 | Cunningham | 138/89 |
| 4,915,137 | * 4/1990 | Hall et al. | 138/96 R |
| 5,224,515 | * 7/1993 | Foster et al. | 138/89 |
| 5,265,752 | * 11/1993 | Olson | 138/89 |
| 5,385,372 | * 1/1995 | Utterberg | 285/901 |
| 5,496,141 | * 3/1996 | Popsys | 138/89 |
| 5,518,033 | * 5/1996 | Webster | 138/89 |
| 5,674,209 | * 10/1997 | Yarger | 285/901 |

OTHER PUBLICATIONS

Caplugs, Product Protection Catalog, Catalog 698, Protective Closures Co., 1998.

* cited by examiner

Primary Examiner—Nathan J. Newhouse
(74) Attorney, Agent, or Firm—Jeffrey W. Astle

(57) ABSTRACT

A disposable closure for covering an opening of a first component during handling and shipping. The disposable closure comprises a body from which an offset interference member extends to prevent a second component from being erroneously connected to the first component while the disposable protective closure is still installed.

18 Claims, 3 Drawing Sheets

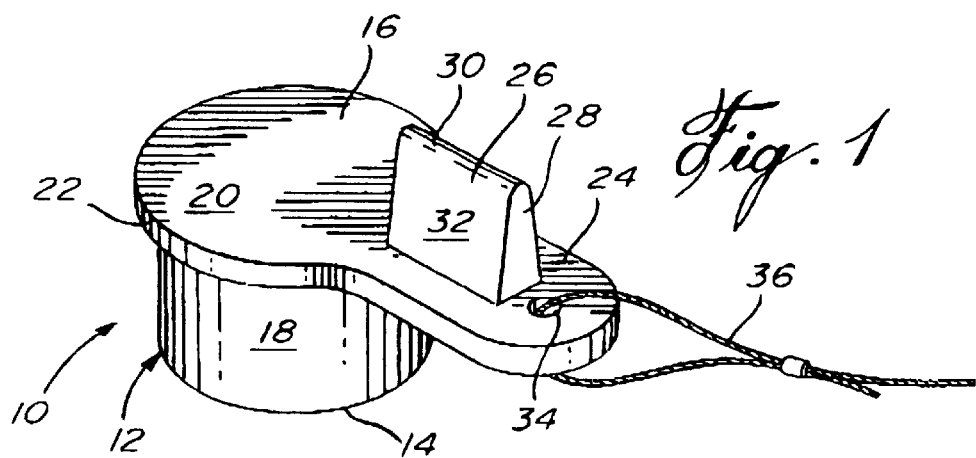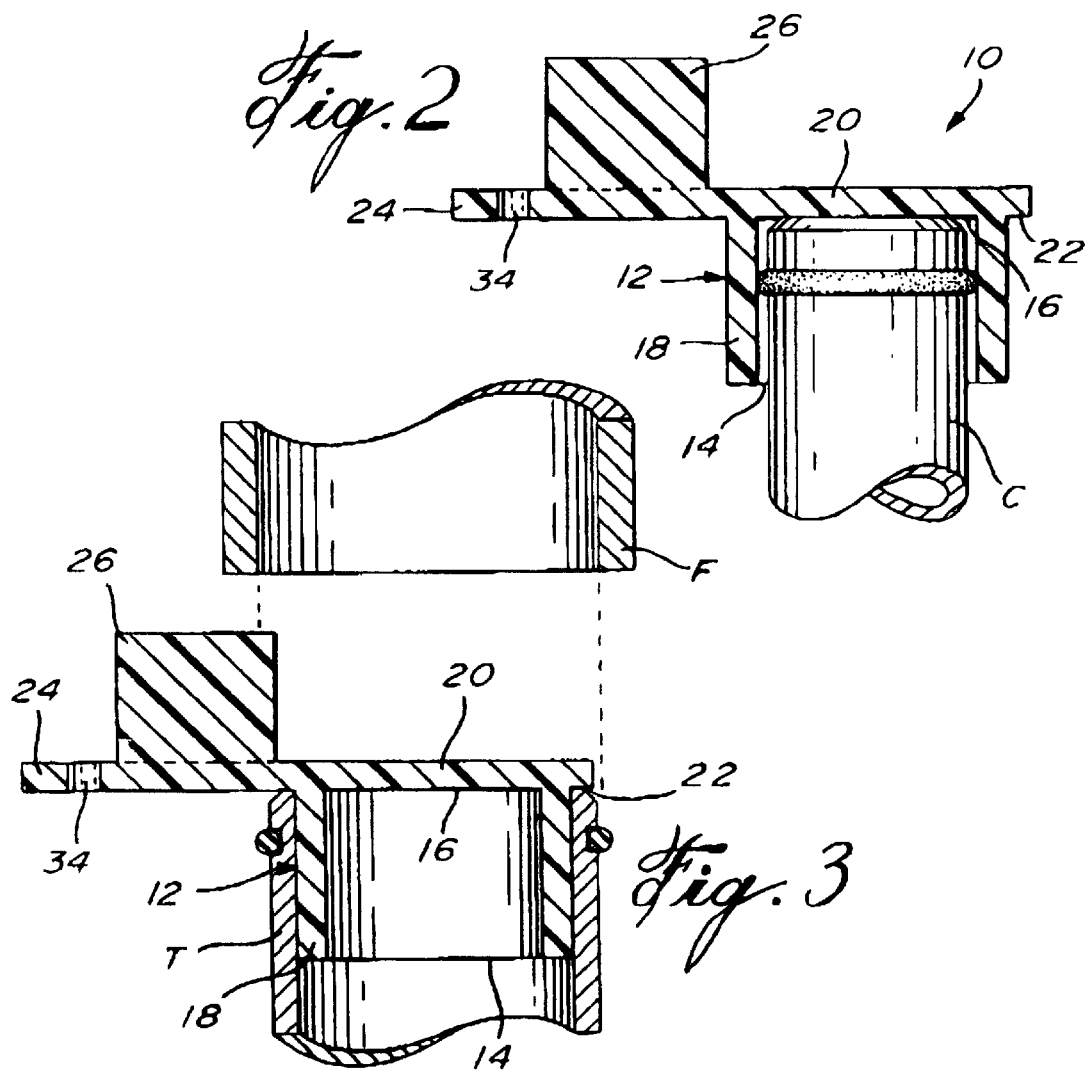

DISPOSABLE PROTECTIVE CLOSURE

BACKGROUND OF THE INVENTION

1. Field of the Invention

The present invention relates to closures and, more particularly, pertains to disposable closures for protecting exposed connecting portions of components during handling, processing and shipping.

2. Description of the Prior Art

Disposable closures, such as plugs and caps, for protecting openings, pipes, tubing, fittings, or rodlike members during handling and shipping are well known in the art.

For instance, U.S. Pat. No. 3,574,312 issued on Apr. 13, 1971 to Miller discloses a closure comprising a hollow cylindrical body having a closed end and an open end surrounded by an integral peripheral flange. This type of closure may be used either as a plug for insertion in bores or as a cap for installation over the ends of cylindrical members. A lip extends axially from the periphery of the flange to facilitate removal of the closure from a bore when it is desired to connect an associated fitting to the bore. The flange and the lip are made of a flexible material to ensure that the same will deform in the presence of nearby objects.

When the closure is used as a plug, the peripheral flange overlies the surface surrounding the bore in which the plug is inserted to prevent the plug from being accidentally pushed into the bore. However, in some situations, for instance, where the outer diameter of the peripheral flange is smaller than the inside diameter of the fitting to be engaged with the tube in which the plug is installed, nothing will systematically prevent the fitting to be assembled to the tube while the closure is still installed. This may result in substantial damages.

Accordingly, it has been proposed to use closures with a wide flange. Although, this solves the problem to some extent, it has been found that such closures could not be used in a great number of applications where surrounding structures interfere with the installation of this particular type of closure.

SUMMARY OF THE INVENTION

It is therefore an aim of the present invention to provide a disposable closure which is adapted to prevent a component from being erroneously connected to another component while the disposable closure is still installed on one of the components.

It is also an aim of the present invention to provide a disposable closure which is relatively simple and economical to manufacture.

Therefore, in accordance with the present invention, there is provided a disposable closure for protecting a port of a component, comprising a body adapted to enclose an opening defined by the port, and a projection extending away from the body relative to the port offset from the opening, whereby the projection will interfere with the connection of another component with the port while the disposable closure is still positioned to enclose the opening.

According to another general aspect of the present invention, there is provided a disposable closure for protecting an article, comprising a body configured to be installed on the article to cover a portion thereof, and a projection extending from the body to a position spaced lengthwise from a trailing end of the body and in a direction away from the article, the projection having a portion spaced from a central axis of the body, thereby providing visual indication of the presence of the disposable closure on the article.

BRIEF DESCRIPTION OF THE DRAWINGS

Having thus generally described the nature of the invention, reference will now be made to the accompanying drawings, showing by way of illustration a preferred embodiment thereof, and in which:

FIG. 1 is a perspective view of a disposable protective closure having an interference member in accordance with a first embodiment of the present invention;

FIG. 2 is a cross-sectional view showing the closure capping a tubular component;

FIG. 3 is a cross-sectional view of the closure of FIG. 1 showing how the interference member prevents two components from being assembled to one another while one of the component is still plugged by the closure;

DESCRIPTION OF THE PREFERRED EMBODIMENTS

Figure 4:
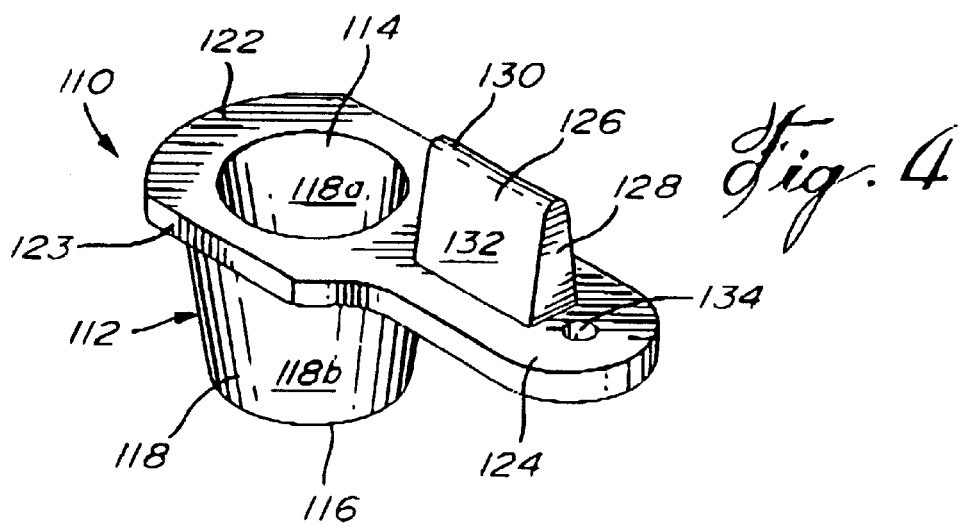
FIG. 4 is a perspective view of a disposable protective closure in accordance with a second embodiment of the present invention.

Now referring to the drawings, and in particular to FIG. 1, a disposable protective closure embodying the elements of the present invention and generally designated by numeral 10 will be described.

More particularly, the disposable protective closure 10 comprises a hollow cylindrical body 12 having an open end 14 and a closed end 16. The body 12 is formed of a circular side wall 18 extending at right angle from an end wall 20.

The end wall 20 projects radially outwardly of the circular side wall 18 so as to form a rim 22 about the closed end 16 of the hollow cylindrical body 12. The rim 22 is formed with a radially extending tab 24 from which a projection 26 extends in a generally normal direction away from the open end 14 of the hollow cylindrical body 12. The projection 26 has two opposed end walls 28 and a top wall 30 merging with a pair of opposed angled side walls 32. The angle side walls 32 provide a tapering profile to the projection 26 in a direction away from the tab 24.

As seen in FIG. 1, a hole 34 may be defined in the tab 24 for receiving an elongated fastener 36, such as a lanyard, in order to secure the disposable protective closure 10 to a structure surrounding the component on which the closure 10 is installed. This may be useful to provide clear indication that a closure is still installed, particularly in applications where the closure is otherwise not easily visible. Accordingly, the elongated fastener 36 will serve as an additional protection to prevent that two parts be assembled while a protective closure is still installed on one of the parts.

The disposable protective closure 10 is preferably integrally molded from a plastic material, such as polyethylene.

As seen in FIGS. 2 and 3, the disposable protective closure 10 may, for instance, be used as a cap for installation over one end of a tubular component C or as a plug for insertion at one end of a tube T. However, it is understood that the disposable protective closure 10 could be used to cover other types of ports or threads. The term port is herein intended to characterized the area of an opening in a component face to be assembled to another component.

As seen in FIG. 2, the disposable protective closure 10 may be positioned over one end of the tubular component C to prevent moisture, debris and other contaminants from entering the tubular component C. The inner surface of the circular side wall 18 of the hollow cylindrical body 12 is frictionally engaged with the outer circumference of the tubular component C to retain the disposable protective closure 10 thereon. In this case, the circular side wall 18 of the hollow cylindrical body 12 extends at least partly over the outer connecting portion of the tubular component C and thus contributes to prevent that another component be engaged with the outer connecting portion of the tubular component C. The tab 24 and the projection 26 offer additional protection to prevent assembly. Indeed, as the tab 24 and the projection 26 are at least partly positioned outwardly of the outer circumference of the tubular component C, they will interfere with the connection of another component with the tubular component C. The thickness of the tab 24 and of the projection 26 is such as to ensure sufficient structural rigidity to perform the intended function.

The projection 26 could also be used to facilitate removal of the closure 10 from the tubular component C. Moreover, the tab 24 and the projection 26 contributes to make the disposable protective closure 10 more visible and thus further prevent potential incidents. It is pointed out that in the event that the projection 26 and the tab 24 are only used to provide added visual indication of the presence of the disposable protective closure 10, the tab 24 and the projection 26 could be made flexible.

As mentioned hereinbefore, the disposable protective closure 10 may also be used as a plug to prevent moisture, dirt and other contaminants from entering a tube T during handling, processing and shipping, as seen in FIG. 3. In such an application, the hollow cylindrical body 12 is inserted in the tube T with the outer surface of the circular side wall 18 frictionally engaging the inner circumference of the tube T to retain the closure 10 in a functional position thereof. The peripheral rim 22 formed by the end wall 20 insures against the closure 10 being accidentally pushed all the way into the tube T.

Since the tab 24 and the projection 26 extend outwardly of the outer circumference of the tube and thus outside of the inner circumference of a female connector F, they will interfere with the connection of the female connector F with the tube T, thereby eliminating the risk that these two machined parts be connected without having previously removed the protective closure 10.

FIG. 4 illustrates another construction of a disposable closure 110 in which the hollow body 112 has a side wall 118 which defines tapering inner and outer frustoconical surfaces 118a and 118b, thereby allowing a same closure to be used in a wide range of opening sizes. The disposable protective closure 110 also differs from the protective closure 10 in that the rim 122 is integrally formed at the open end 114 of the hollow body 12 rather than at the closed end 116 thereof. Furthermore, the rim 122 could be formed with lateral flat portions 123 to provide added clearance. This is particularly useful when it is desired to install closures 110 in side by side openings which are in close proximity to one another.

Figure 5:
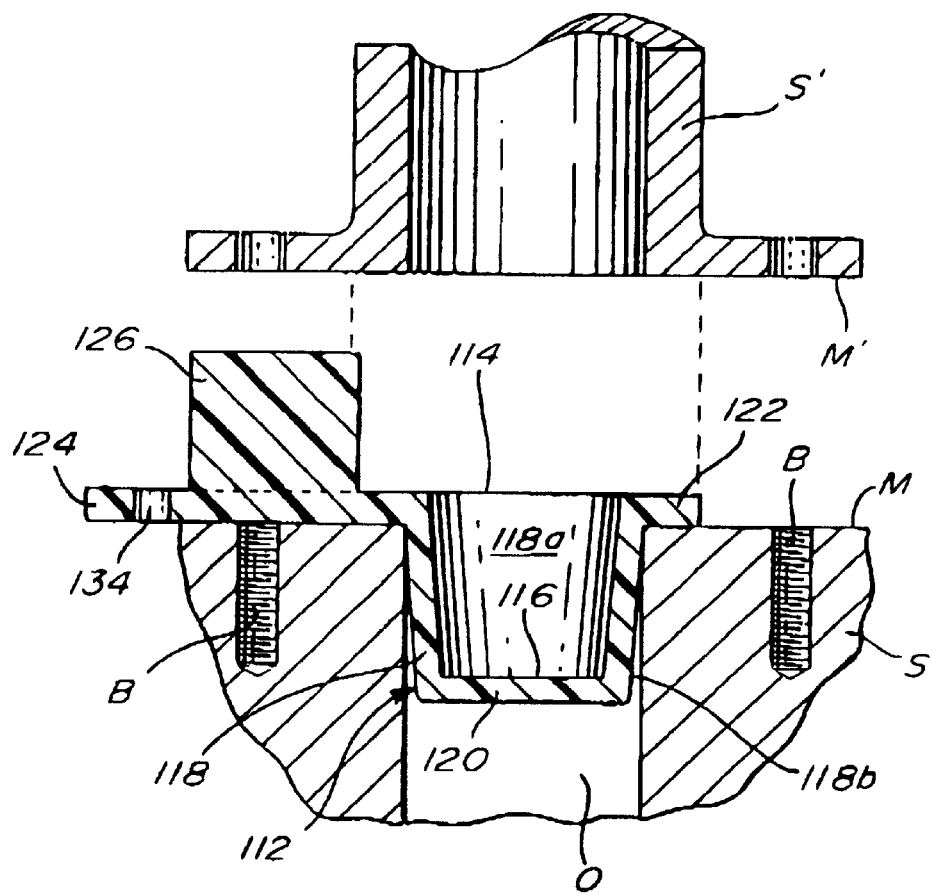
FIG. 5 is a cross-sectional view of the closure of FIG. 4 showing how the interference member prevents two components from being assembled to one another while one of the component is still plugged by the closure.

As seen in FIG. 5, the closure 110 is suited to be used as a plug to cover an opening O defined in a mounting surface M of a structural member S. Threaded bores B are defined in the mounting surface M for receiving bolts to assemble the structural member S to a second structural member S' having a corresponding mounting surface M'. In this situation, the projection 126 will prevent the mating surfaces M and M' from being placed in uniform contact, thereby precluding the assembly of the structural members S and S' while the closure is still positioned in the opening O.

One advantage of the present invention resides in the fact that the above described protective closures 10 and 110 can be used in a wide variety of applications and still render ineffectible the connection of components while the protective closure is installed.

Figure 6:
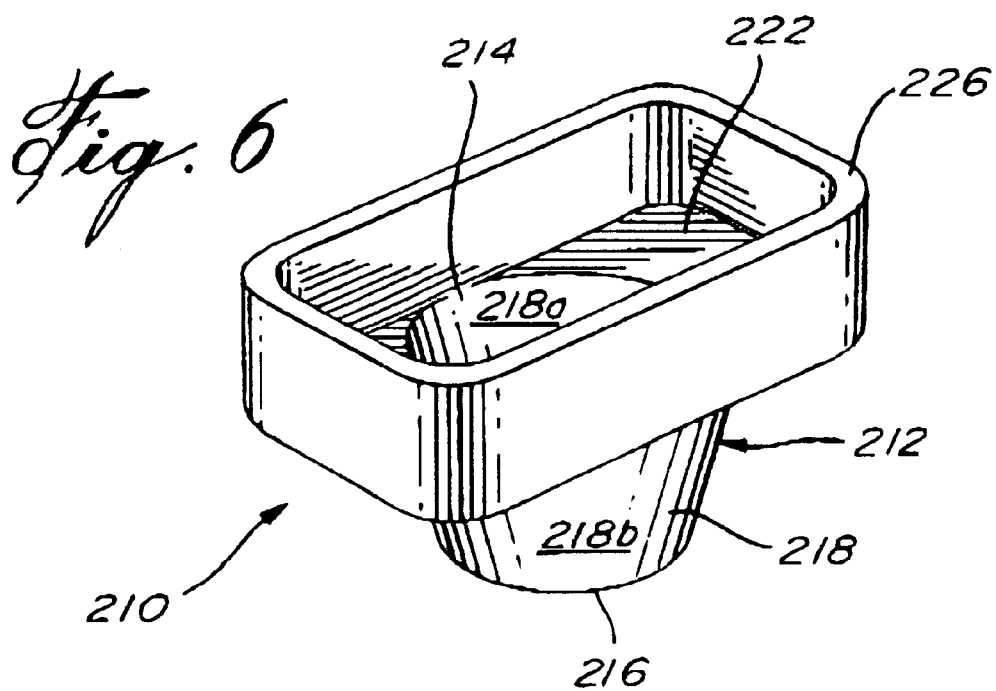
FIG. 6 is a perspective view of a disposable protective closure in accordance with a third embodiment of the present invention.
Figure 7:
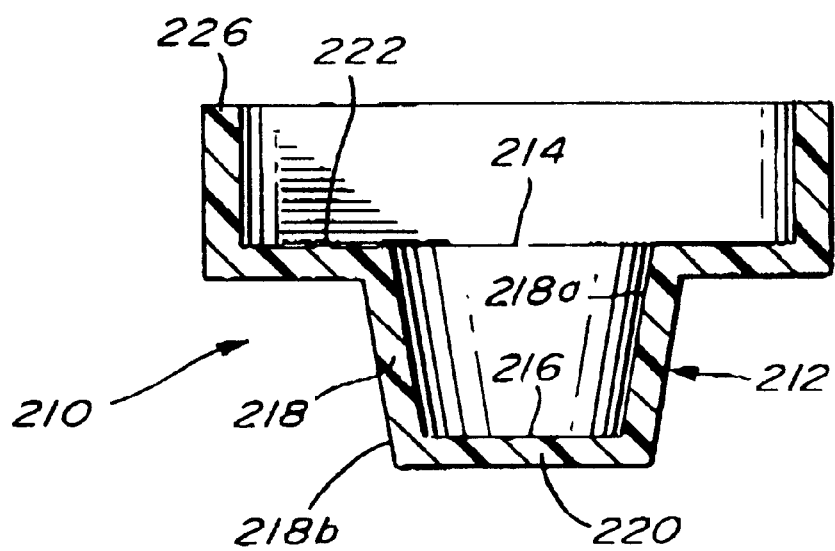
FIG. 7 is a cross-sectional view of the closure of FIG. 6.

FIGS. 6 and 7 illustrate a third embodiment of the present invention wherein the disposable protective closure 210 includes a hollow body 212 having a side wall 218 which defines inner and outer frustoconical surfaces 218a and 218b tapering from an open end 214 to a closed end 216 of the hollow body 212. A rim 222 extends radially outwardly from the open end 214 of the hollow body 212. A projection 226 extends axially from the periphery of the rim 222 to interfere with the connection of a component with another component in which the closure is plugged, as per the way described hereinbefore.

It is understood that the above described protective closures 10, 110 and 210 may be used with either threaded or non-threaded connectors.

According to a further embodiment of the present Invention, the projection could extend across the open end of the closure. However, in this case, the closure could only be used as a plug.

What is claimed is:

1. A disposable closure for protecting a port of a first component having a mating surface adapted to matingly engage with a corresponding mating surface of a second component, wherein the port defines an opening, said disposable closure comprising a body adapted to close the opening defined by said port, a rim extending laterally outwardly from said body, said rim having a predetermined thickness, a projection extending from said rim in a direction axially away from said body, wherein at least part of said projection extends between respective mating surfaces of the first and second components, and wherein said projection has a top surface which is spaced from said rim by a distance substantially greater than said predetermined thickness of said rim, thereby allowing said projection to act as an interference member for preventing the second component from being connected to said port of said first component, while said disposable closure is still positioned to close said opening, and a tab extending radially from said rim, said projection extending at least partly from said tab and being oriented in a transversal direction with respect to said body.

2. A disposable closure as defined in claim 1, wherein a hole is defined in said tab for receiving an elongated fastening element in order to attach said disposable closure to a surrounding structure.

3. A disposable closure as defined in claim 1, wherein said peripheral portion and said body are integral.

4. A disposable closure as defined in claim 1, wherein said top surface extends from a first end wall located laterally outwardly of said body to a second opposed end wall located in sufficient proximity to said body to interfere with the connection of the first and second components.

5. A disposable closure as defined in claim 1, wherein said body is hollow and includes an open end and a closed end.

6. A disposable closure as defined in claim 5, wherein said rim is disposed at said closed end of said body, whereby said disposable closure may be used either as a plug or a cap with said projection extending in a direction away from said open end of said body.

7. A disposable closure as defined in claim 6, wherein said body is provided with straight side walls.

8. A disposable closure as defined in claim 5, wherein said rim is disposed at said open end of said body, said projection extending in a direction away from said closed end of said body to prevent assembly when said disposable closure is used as a plug.

9. A disposable closure as defined in claim 8, wherein said body is tapered.

10. A disposable protective closure for use in a structure having first and second components to be joined together and defining an interface therebetween, and wherein the first component defines an opening at the interface, said disposable protective closure comprising a body adapted to cover the opening, a rim extending laterally outwardly from said body, an interference member extending from said rim to a position spaced lengthwise from a trailing end of said body, said interference member having a top wall extending between a first end wall located laterally outwardly of said body and a second opposed end wall located in sufficient proximity to said body to be interposed between the first and second components at the interface thereof, and an uneven bearing surface for the second component formed by one of said top wall of said interference member and a combination of said rim and said top wall, thereby preventing the second component from being erroneously connected to the first component while said disposable protective closure is still installed.

11. A disposable closure as defined in claim 10, wherein said rim has a predetermined thickness, and wherein said top wall is spaced from said rim by a distance substantially greater than said predetermined thickness of said rim.

12. A disposable closure as defined in claim 10, wherein said interference member is provided at a discrete location along said rim on one side of said body.

13. A disposable protective closure as defined in claim 10, wherein a tab extends radially from said rim, said interference member extending from said tab and being oriented in a transversal direction with respect to said body.

14. A disposable protective closure as defined in claim 13, wherein a hole is defined in said tab of said body for receiving an elongated fastening element in order to attach said disposable protective closure to a surrounding structure.

15. A disposable protective closure as defined in claim 13, wherein said body is hollow and includes an open end and a closed end.

16. A disposable protective closure as defined in claim 15, wherein said rim is disposed at said closed end of said body, whereby said disposable protective closure may be used either as a plug or a cap with said interference member extending in a direction away from said open end of said body.

17. A disposable protective closure as defined in claim 15, wherein said rim is disposed at said open end of said body, said interference member extending in a direction away from said closed end of said body to prevent assembly when said disposable protective closure is used as a plug.

18. A disposable closure for protecting an article adapted to be connected to a corresponding article, comprising a body configured to be installed on the article to cover a portion thereof, a rim extending laterally outwardly from said body, a tab extending radially from said rim, and a projection extending at least partly from said tab to a position spaced lengthwise from a trailing end of said body and in a direction away from the article, said projection having a portion spaced from a central axis of said body and being transversally oriented with respect thereto to interfere with a connection of the corresponding article with the article while said disposable closure is still installed thereon.

* * * * *